Feb. 4, 1930.  R. BERNAT  1,746,185
COMBINED CONDENSER AND SEPARATOR
Filed June 6, 1927  2 Sheets-Sheet 1
Fig_1
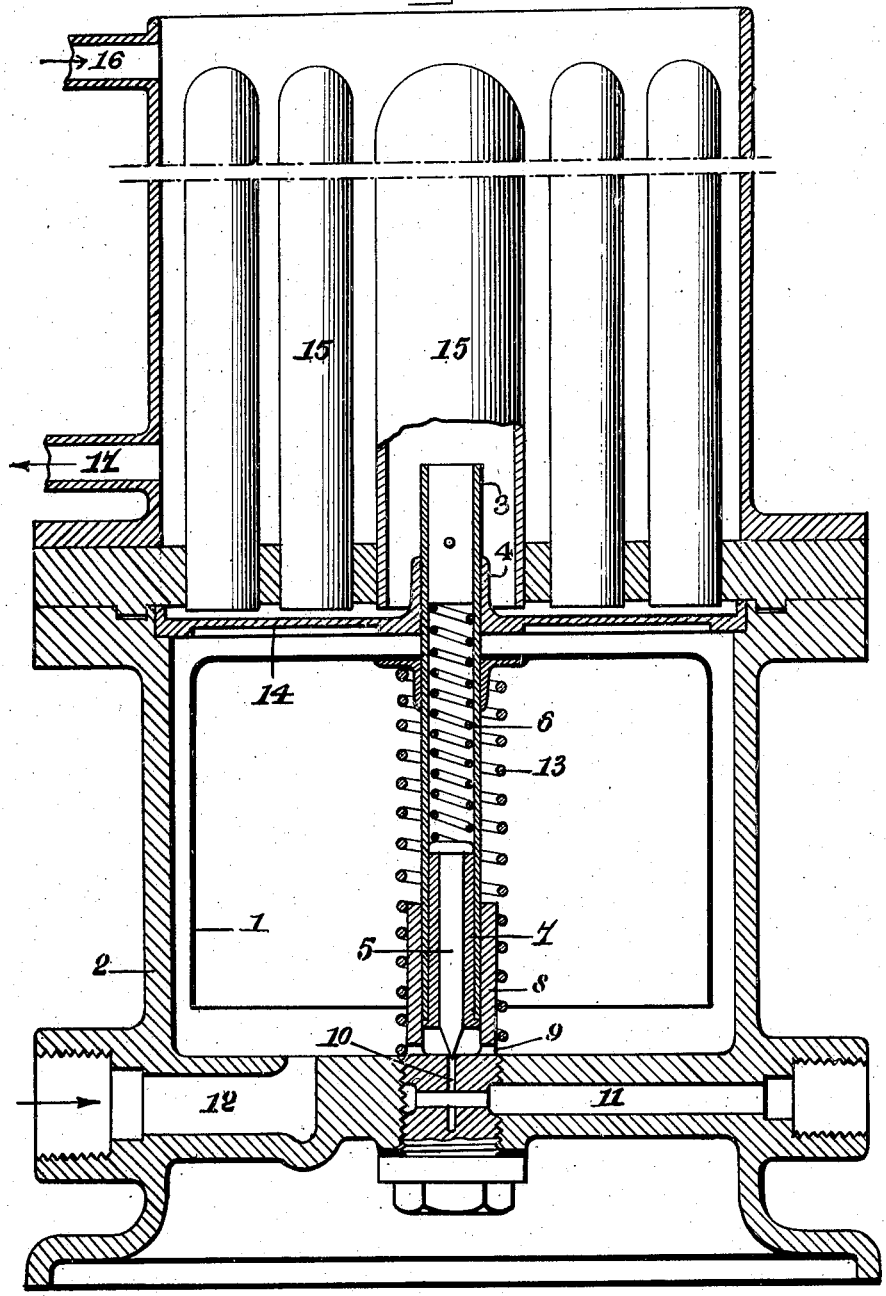
INVENTOR
Raoul Bernat
by Lang nu, Parry, Card and Langner
Attys.

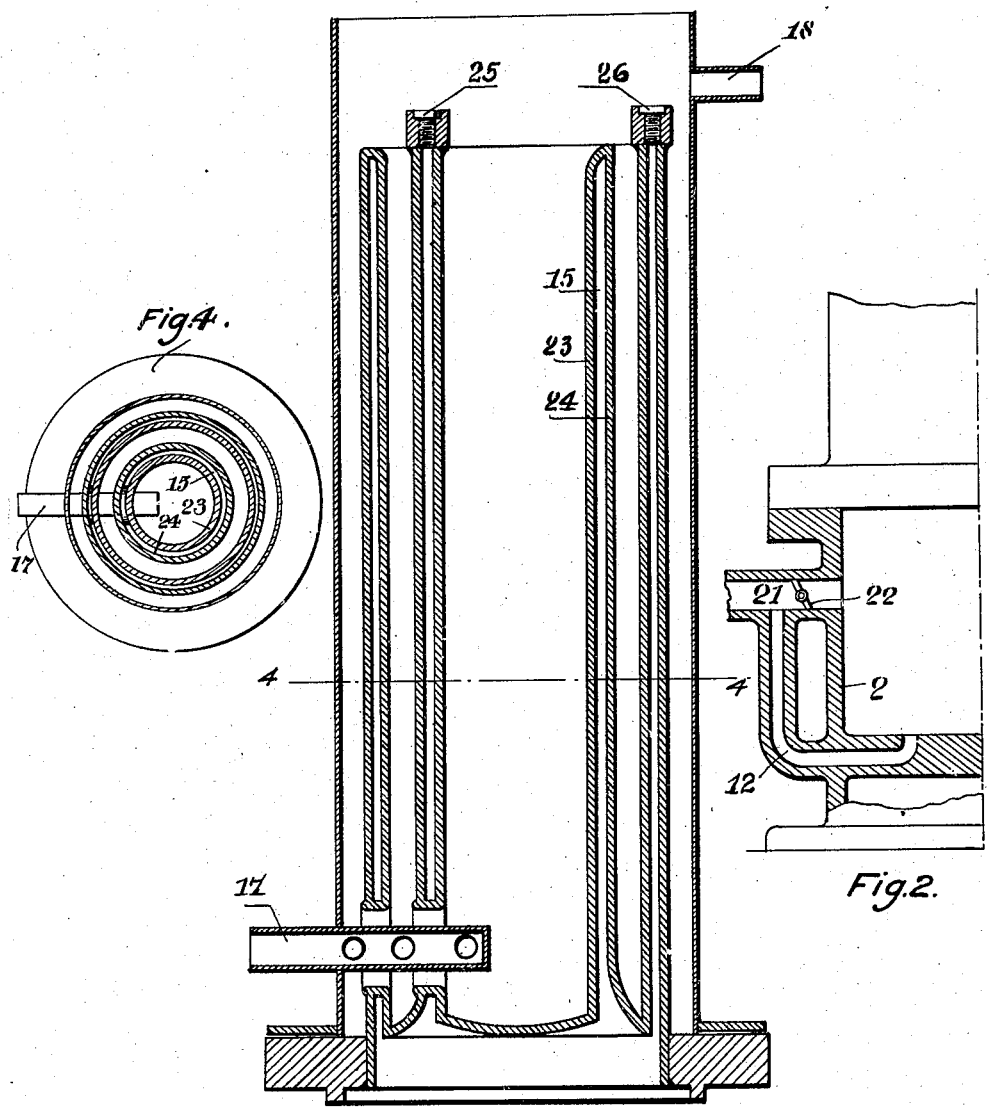

Patented Feb. 4, 1930

1,746,185

UNITED STATES PATENT OFFICE

RAOUL BERNAT, OF BORDEAUX, FRANCE

COMBINED CONDENSER AND SEPARATOR

Application filed June 6, 1927, Serial No. 196,974, and in France June 10, 1926.

The present invention relates to a combined condenser and separator which is characterized by the fact that it comprises suitable condensing elements which are in communication with the atmosphere of a separator and may consist of vertical tubes whose lower part is connected with the separator.

The separator of the float type preferably consists of a needle valve which is under the elastic control of a float which has the form of a bell or a basin, and is automatically controlled by the level of the liquid in the receptacle containing the float.

The appended drawings show by way of example various embodiments of the invention.

Fig. 1 shows one form of construction, and Fig. 2 is a modification of the same. Fig. 3 shows another arrangement of the condensing parts, while Fig. 4 is a cross section taken along the line 4—4 of Fig. 3.

In the example shown in Fig. 1, a float 1 is movable in the chamber 2; said float has a bell shape and is open at the bottom. To the float 1 is secured a hollow rod 3 which is slidable in a guide 4. A spring 6 urges the head of the needle 5 upon a seat 7 fixed in the hollow rod 3.

The lower end of the hollow rod 3 is slidable in a block 8 in which there are apertures 9 at the level of the bottom of the chamber 2 and which forms a seat for the needle 5. This latter is adapted to close a conduit 10 connecting the interior of the chamber 2 with the discharge conduit 11.

The chamber 2 is supplied with material through the admission conduit 12. The weight of the float 1 is at least partly counterbalanced by a spring 13.

Above the float 1 and at a sufficient height is disposed the filter 14 by which foreign bodies from the condensing apparatus are prevented from interfering with the functioning of the valve 5.

Above the filter 14 is disposed a condenser with vertical tubes. The vertical disposition of said tubes is one of the important features of the present apparatus.

The gaseous parts of the mixture which is supplied through the admission conduit 12 will enter the tubes 15 which are cooled by a cooling brine which is supplied by the pipe 16 and issues through the pipe 17.

The operation of the said apparatus is as follows:—

The mixture under treatment is supplied by the admission conduit 12; the gaseous portion becoming separated from the liquid part rises in the float, displacing whatsoever may be in the float, until the float is filled with the gas which then escapes around the edge of the float. The float then has the same buoyancy as if it were a sealed chamber, but by being open on the lower side it has the advantage of permitting the mixture of liquid and gas to bubble up into the float from the supply pipe and follow a return path to the edge of the float, thus traversing an extended path by which opportunity is given for the gas and liquid to completely separate. The gas then rises through the annular space between the float 1 and walls of the chamber 2, then traversing the filter 14 and condensing in the tubes 15. The resulting liquid flows through the filter in the other direction and collects at the bottom of the chamber 2 together with the remainder of the liquid.

When the level of the liquid at the bottom of the chamber has attained a certain level, the float 1 rises together with the needle 5; the conduit 10 is thus supplied with the liquid which is discharged through the conduit 11.

When the level of the liquid in the lower part of the chamber 2 descends, the float 1 again falls and applies the needle 5 upon its seat; due to the spring 6, the needle comes upon its seat in an easy manner.

It will be thus impossible for even the smallest portion of the gas to flow through conduit 10 and thence into the outlet conduit 11.

In the modification shown in Fig. 2, which is chiefly applicable to the device shown in Fig. 1, the mixture is supplied by the conduit 12 as shown in Fig. 1, the mixture being received by said conduit through a conduit 21 which makes direct connection with the chamber 2 by way of the adjustable valve 22.

In this modification, the functioning of the apparatus is practically the same as in the device shown in Fig. 1.

In the construction shown in Fig. 3, the set of condensing tubes situated above the separator is replaced by double-walled annular tubes in concentric disposition which are externally cooled by the brine; the gas is condensed in the inner annular part of said tubes between the internal and the external walls of the tube.

The gaseous parts enter the inner portion of the double-walled annular tubes 15, around which is circulated the cooling water which is supplied by the pipe 17 and is discharged by the pipe 18. Due to the short distance between the walls 23 and 24 of any given tube 15, the gases will be very rapidly condensed.

The closing screws 25 and 26 serve to evacuate the air when the apparatus is started, or at any other time when required.

The said tubes may be combined with a suitable separating device, and they may be optionally provided with cooling flanges. I have obtained valuable results by the use of capillary tubes.

Having now particularly described my invention, and in what manner the same is to be performed, I claim as my invention:

1. A combined separator and condenser, comprising a separator, condenser elements communicating with and arranged to drain into said separator, said separator including means forming a chamber and an open float in said chamber, the buoyancy of said float being acquired from the gas separating from the mixture to be separated, and an outlet valve for said separator controlled by said float.

2. A combined separator and condenser as claimed in claim 1, the wall of said float acting as a baffle to lengthen the path of travel of the mixture being separated.

3. A combined separator and condenser as claimed in claim 1, including a resilient connection between said float and the valve controlled thereby.

4. A combined separator and condenser as claimed in claim 1, including a filter between said condensing elements and separator.

5. A combined separator and condenser as claimed in claim 1, the float being mounted with the opening at the lower side, and a supply pipe for said mixture discharging into said separator beneath said opening.

6. Apparatus for the separation of a mixture of gas and liquid comprising a container provided with an opening at the lower part, a needle valve closing this opening, a float in the form of a bell controlling said needle valve, and a feed passage emptying under the bell so that the gas passing in through said passage passes into the bell.

7. Apparatus for the separation of a mixture of gas and liquid comprising a container provided with an opening at the lower part, a needle valve closing this opening, a float in the form of a bell controlling said needle valve through resilient means, and a feed passage emptying under the bell so that the gas passing through said passage passes into the bell.

8. Apparatus for the separation of a mixture of gas and liquid comprising a container provided with an opening at the lower part, a needle valve closing this opening by means of a spring, and a feed passage emptying under the bell in a manner such that the gas passing in through this passage passes into the bell.

9. Apparatus for condensing a gas, comprising a container having an opening at the lower part, a needle valve closing said opening, a float in the form of a bell controlling said needle valve, a feed passage emptying under the bell in a manner such that the gas entering through this passage passes into the bell, a partition above the float and vertical tubes secured in the partition and having closed upper ends and open lower ends communicating with the space below the partition, said tubes being adapted to be surrounded by a cooling medium.

10. Apparatus according to claim 9, comprising vertical concentric tubes, the walls of each tube being separated by a capillary space communicating with the gas to be condensed.

11. Apparatus according to claim 9, comprising vertical concentric tubes, the walls of each tube being separated by a capillary space closed at the upper part and open at the lower part in the zone containing the gas to be condensed.

12. Apparatus according to claim 9, comprising series of vertical concentric tubes, the walls of each tube being separated by a capillary space wherein the gas to be liquefied circulates and the tubes being separated by a larger space wherein the cooling fluid circulates.

RAOUL BERNAT.